United States Patent
Kent et al.

(10) Patent No.: US 8,985,491 B2
(45) Date of Patent: Mar. 24, 2015

(54) NUT CHOPPER

(71) Applicant: Progressive International Corporation, Kent, WA (US)

(72) Inventors: Joseph Kent, Seattle, WA (US); Sascha Kaposi, Tacoma, WA (US)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 13/867,383

(22) Filed: Apr. 22, 2013

(65) Prior Publication Data

US 2013/0334351 A1    Dec. 19, 2013

Related U.S. Application Data

(60) Provisional application No. 61/661,131, filed on Jun. 18, 2012.

(51) Int. Cl.
| | |
|---|---|
| A47J 42/00 | (2006.01) |
| B02C 4/08 | (2006.01) |
| A47J 43/07 | (2006.01) |
| B02C 18/16 | (2006.01) |
| A47J 42/24 | (2006.01) |

(52) U.S. Cl.
CPC .................. *A47J 43/07* (2013.01); *B02C 18/16* (2013.01); *A47J 42/24* (2013.01)
USPC ........................ 241/169.1; 241/243; 241/88.4

(58) Field of Classification Search
USPC ...................... 241/88.4, 169.1, 243
See application file for complete search history.

(56) References Cited

U.S. PATENT DOCUMENTS

| | | | | |
|---|---|---|---|---|
| 2,001,075 | A | * | 5/1935 | Sundstrand .................. 241/88.4 |
| 2,280,211 | A | | 8/1940 | Bernhardt |
| 2,398,933 | A | * | 4/1946 | Grant ............................. 241/239 |
| 2,507,571 | A | * | 5/1950 | Lacout .......................... 241/243 |
| D196,093 | S | | 8/1963 | Ostrowsky |
| 3,357,468 | A | | 2/1965 | Brinch-Moller |
| 3,527,277 | A | | 11/1967 | Woods |
| 3,949,637 | A | * | 4/1976 | Funke ............................. 83/570 |
| 5,155,975 | A | * | 10/1992 | Knowler ......................... 53/513 |
| 6,024,310 | A | * | 2/2000 | Herdman ................... 241/46.08 |
| D424,889 | S | | 5/2000 | Yip |
| D502,062 | S | | 2/2005 | Kaposi |
| D673,013 | S | | 12/2012 | Kent et al. |

FOREIGN PATENT DOCUMENTS

| | | |
|---|---|---|
| FR | 1424967 A | 1/1966 |
| FR | 2338029 A1 | 8/1977 |

OTHER PUBLICATIONS

Progressive International Corporation; Image of 2005 Nut Chopper.

\* cited by examiner

*Primary Examiner* — Faye Francis
(74) *Attorney, Agent, or Firm* — Lowe Graham Jones PLLC

(57) ABSTRACT

A nut chopper includes an upper hopper, a lower container, and a grate positioned between the hopper and container. A series of parallel blades supported on an axle and coupled to a crank is positioned so that the blades may be rotated through the grate. As the blades pass through the grate, they chop the nuts that are in the path of the blades. Once individual nuts are chopped into sizes that are smaller than the width of the openings formed in the grate, the chopped portions will fall through the grate and into the container.

2 Claims, 4 Drawing Sheets

NUT CHOPPER

PRIORITY CLAIM

This application claims the benefit of provisional application Ser. No. 61/661,131 filed Jun. 18, 2012, the contents of which are incorporated by reference.

FIELD OF THE INVENTION

This invention relates generally to devices for chopping and grinding nuts and similar food items.

BACKGROUND OF THE INVENTION

Chopping nuts can be a very difficult exercise. Commonly, nuts are chopped using a large kitchen knife pressing downward against nuts that are spread out on a cutting board. This process takes time, and because nuts are often rounded and oddly shaped it is difficult to chop the nuts evenly. It is also common for individual nuts to roll away from the knife, making it challenging and potentially dangerous to chop them. Electronic food processors may be used, but in most cases it is difficult to ensure that the nuts are chopped to a relatively uniform size.

SUMMARY OF THE INVENTION

In a preferred version of the invention a nut chopper includes an upper hopper, a lower collector or container, and a grate positioned between the hopper and container. A series of parallel blades supported on an axle and coupled to a crank is positioned so that the blades may be rotated through the grate. As the blades pass through the grate, they chop the nuts that are in the path of the blades. Once individual nuts are chopped into sizes that are smaller than the width of the openings formed in the grate, the chopped portions will fall through the grate and into the container.

In some versions of the invention, the grate may include slots or openings having different widths on each side. In such a version, nuts of a relatively larger size are able to fall through the wider portion of the grate while the narrower portion of the grate only allows smaller nuts to pass through. Accordingly, rotation of the blades in a first direction such that they pass through the nuts on their way through the narrower grate width will chop the nuts to a finer size, while rotation of the blades in the opposite direction such that they pass through the nuts immediately before passing through the wider side of the grate will chop the nuts to a more coarse size.

In a further feature of some versions of the invention, the crank may be operated in either a clockwise or counterclockwise direction. As noted above, this allows the nuts to be chopped to a desired size depending on the configuration of the grate. In addition, it allows the hopper and container to be inverted once the nuts are chopped so that the process can be repeated a second time. The second pass of the blade through the nuts results in nuts that are chopped to a finer size.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
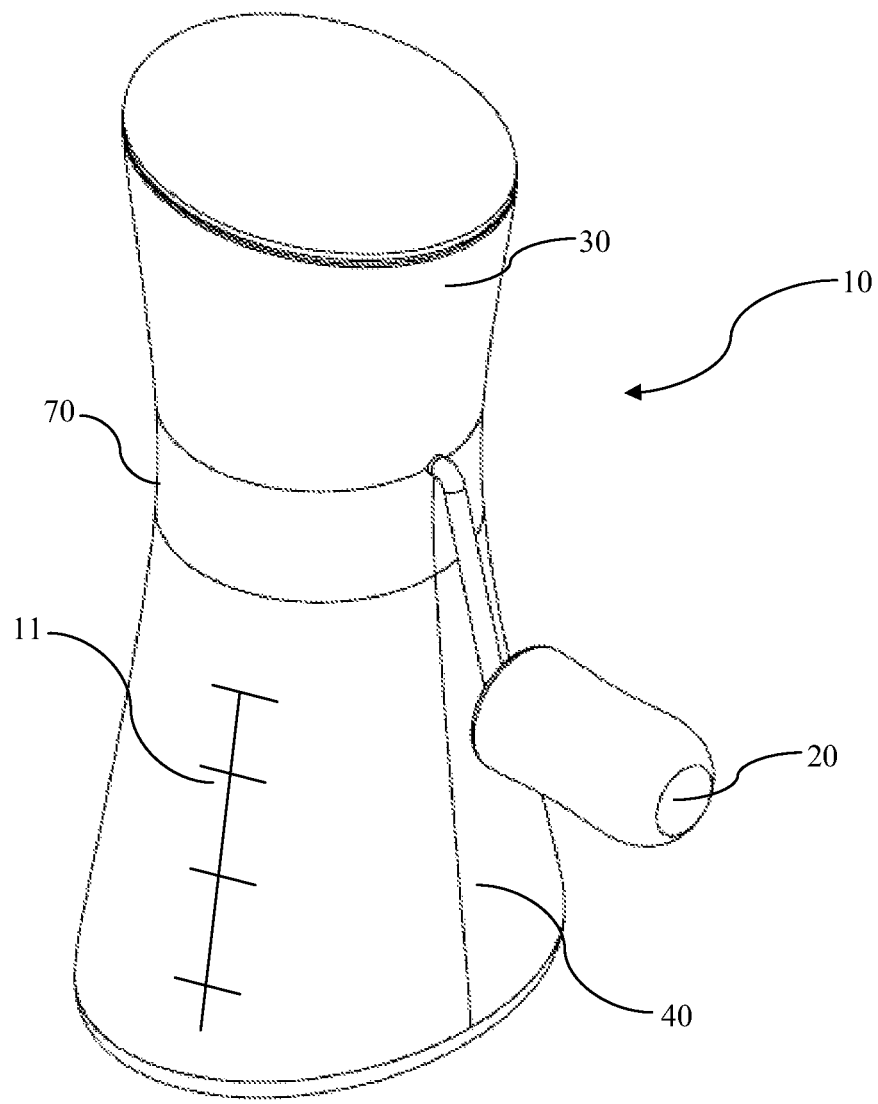
FIG. 1 is a perspective view of a preferred nut chopper.
Figure 2:
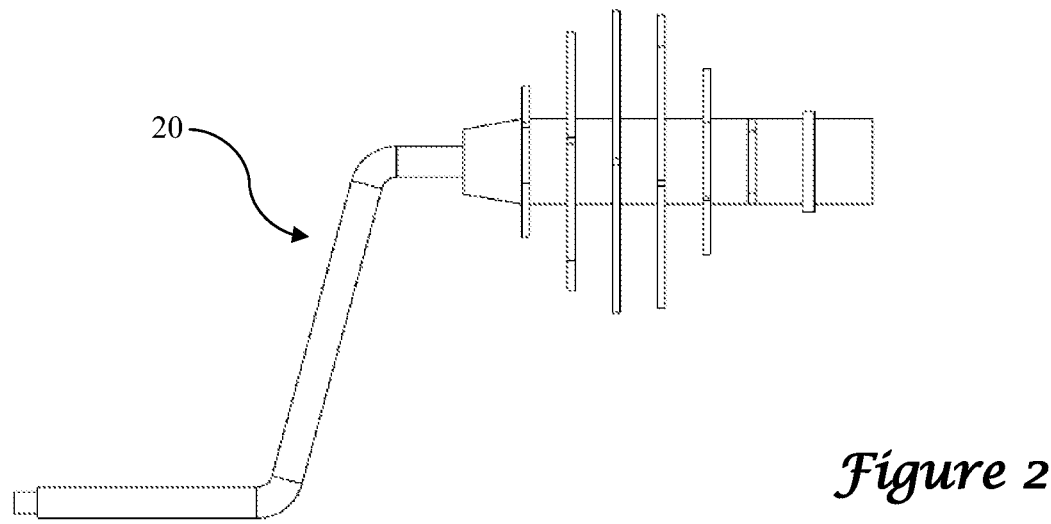
FIG. 2 is a front view of a handle and set of blades for use with a preferred nut chopper.

A preferred example of a nut chopper 10 is shown in the accompanying figures. The exemplary nut chopper includes an upper hopper 30 carried on a lower container 40. Most preferably, a neck 70 is formed at a juncture between the hopper and the container, with the neck being narrower than both the upper hopper and the lower container. Similarly, the hopper is preferably formed in a generally conical or tapered shape, being narrower adjacent the neck and wider at the top. In this configuration, nuts deposited into the hopper are naturally funneled toward the neck of the body of the device for chopping. The wider base of the lower container further adds to the stability of the device, and allows the lower container to serve as a hopper if the device is inverted. In the preferred version, the container body is sized to be hand-held, with one hand holding the container body and another hand operating a crank that drives a set of blades to chop the nuts directed downward by the hopper.

In some versions, a lid 31 is formed at the top of the hopper so that nuts can be inserted into the hopper with the lid removed and then the lid can be replaced to allow chopping. In other versions, either with or without a lid, the hopper is removably attached to the lower container such that nuts can be deposited into the hopper when it is removed from the container. Likewise, separation of the hopper from the container allows both the hopper and the container to be cleaned. In one example, a lower rim of the hopper may be friction-fitted into an upper rim of the lower container that generally forms the neck of the main container body.

Figure 4:
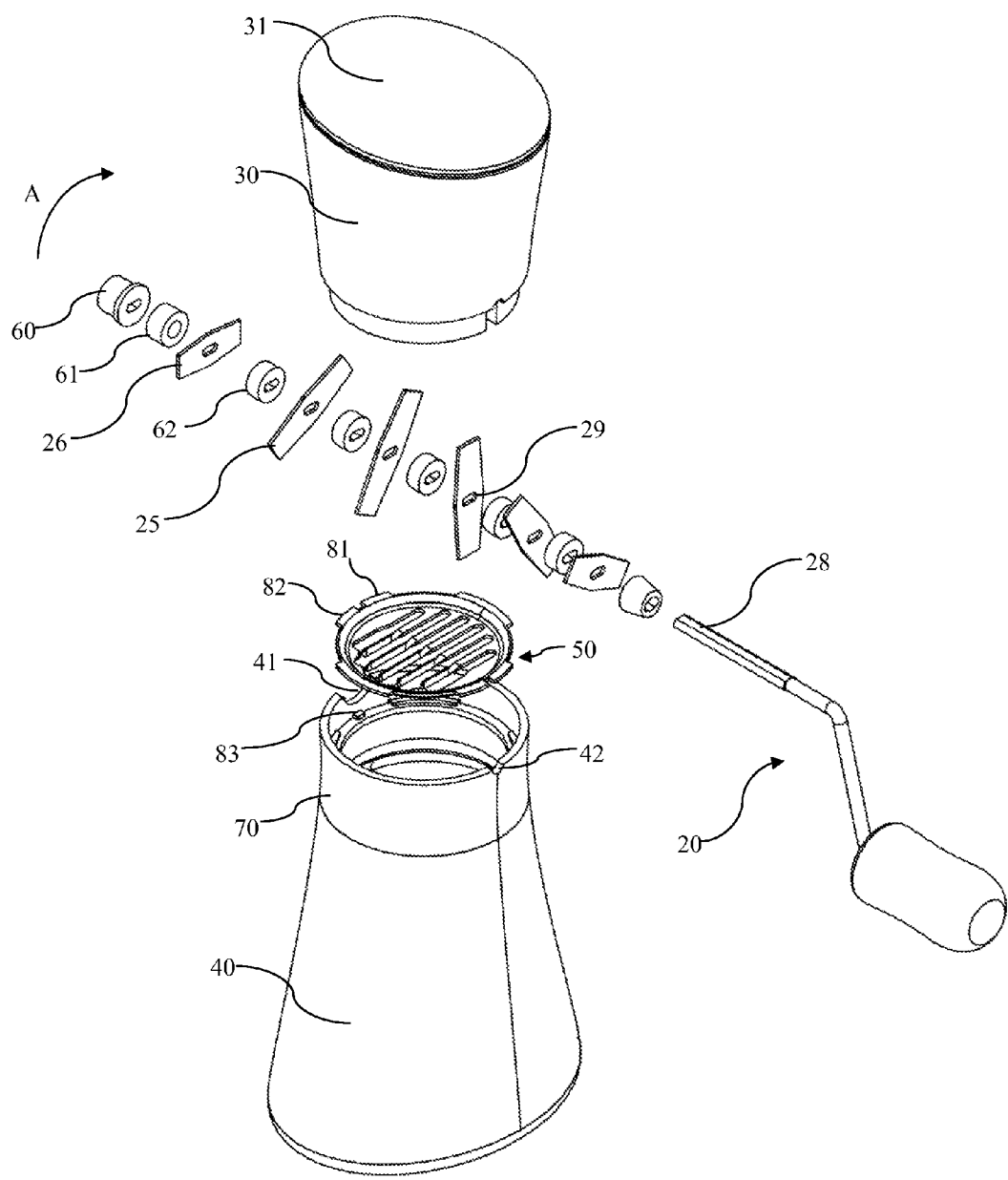
FIG. 4 is a perspective exploded view of a preferred nut chopper.

A grate 50 is positioned within the neck of the container, preferably supported by a flange or seat extending radially inward from an inner sidewall of the neck. In the preferred version of the invention as best seen in FIG. 4, the neck 70 is formed at an upper end of the lower container 40 and the flange or seat is provided along an inner sidewall of the neck.

Figure 5:
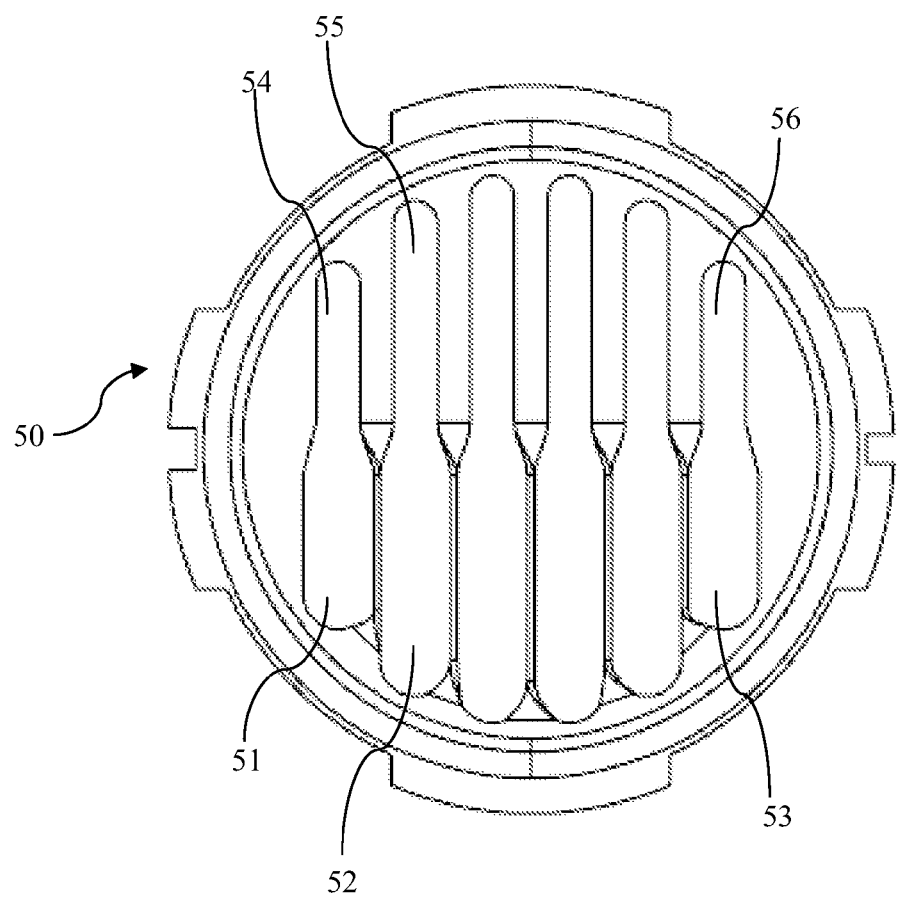
FIG. 5 is a top plan view of a preferred nut chopping grate for use with a nut chopper.

The grate is formed with a plurality of parallel elongated slots or openings allowing chopped nuts to fall through the grate, as best seen in FIG. 5. In one version of the invention, the parallel openings are all substantially uniform and generally rectangular or oblong in shape. In another version, such as the illustrated version, the grate includes a first half and a second half, each of the slots having a portion in the first half and a portion in the second half of the grate. The elongated slots are generally formed in two halves, with the portion of the slots in the first half being wider than the portion of the slots in the second half As illustrated in the version of FIG. 5, the grate is substantially circular in shape, with each of the first half and second half forming semicircular portions of the circular grate (as viewed in FIG. 5, the first half is at the lower portion of the page and the second half is at the upper portion of the page). In this version, each of the openings formed in the grate extends continuously from the first half to the second half, but at a location generally along the center of the grate the openings are narrower in a first direction and wider in the second direction. In other versions of the invention the grate may be square or have a different perimeter shape.

The grate 50 of the preferred version therefore includes several parallel slots or openings and in one example it includes six such openings. The slots include wider portions at the first side, for example opening portions 51, 52, 53, each of which transitions to a narrower opening portion at the second side, for example 54, 55, 56. Together the narrower and wider opening portions join together to form continuous slots.

The grate may be formed from a unitary section of metal in which the openings are stamped or otherwise formed in the metal plate to form the grate. Alternatively, the grate may be formed from plastic, ceramic, or other materials.

The grate 50 may further include a series of peripheral flanges formed about the perimeter of the grate, with the flanges 81, 82 separated by a gap. The gap is sized and positioned to receive a peg 83 formed on an interior seat formed within the neck in order to allow the grate to be aligned properly within the neck 70, and thereby ensure that the blades rotate uniformly in an aligned manner between the parallel openings.

Figure 3:
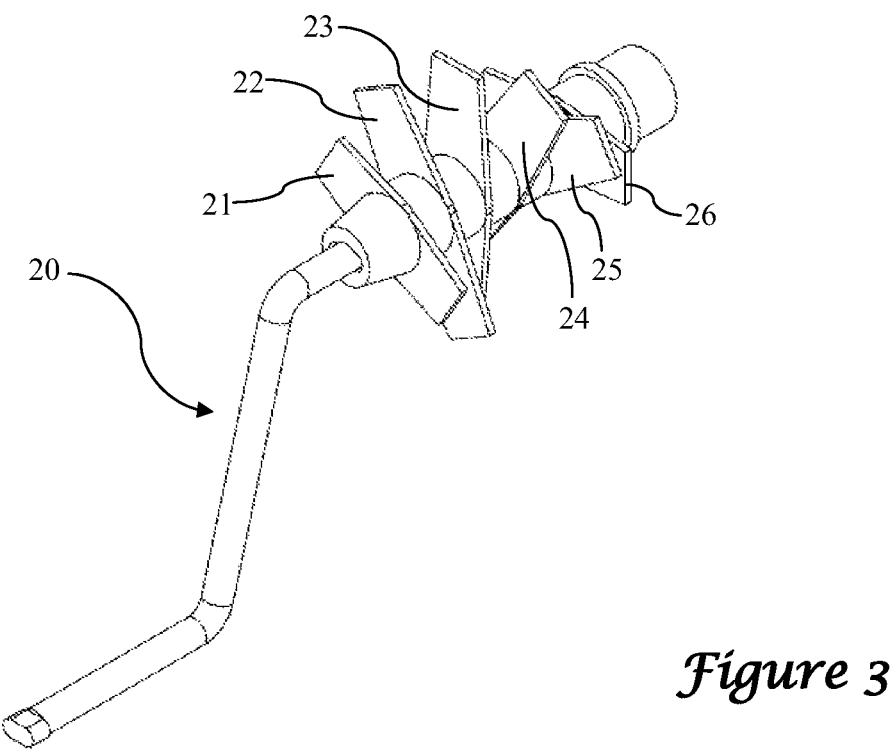
FIG. 3 is a perspective view of the handle and set of blades illustrated in FIG. 2.

The chopper includes a crank handle 20 supporting a series of parallel blades, for example 21-26, mounted on an axle for rotation. Most preferably, there is a single blade for each opening in the grate. Accordingly, in a version of the invention in which there are six openings in the grate, six blades are provided. Each blade further has a length defined in a direction perpendicular to the axle and parallel to the blade edge, with the length of the blade being close to but slightly less than the length of the corresponding grate opening. When a circular grate is used, the blades positioned in the center of the set of blades (for example, blades 23 and 24 as best seen in FIG. 3) will preferably be longer than those at the outside of the set of blades (for example, blades 21 and 26) because the slots or openings of the grate may be formed to be longer at the center of the grate than at the outer portion, along the perimeter of the grate.

The axle 28 portion of the crank 20 is carried on the body of the chopper, preferably being supported above the grate 50 in the vicinity of the neck 70 of the device. In order to allow the blades to pass evenly through the grate, the axle is mounted perpendicularly to the parallel openings in the grate. In one version, the neck includes a pair of openings 41, 42 formed in the neck of the body of the chopper to support the axle. As best seen in FIG. 4, a distal end of the axle may be configured to be received by a bearing 60 which is seated in one of the openings 42 sized to mount the bearing. A proximal end of the axle, relatively closer to the crank handle, may be seated in a smaller opening 41 sized to receive the axle for rotation.

As shown, in one version of the invention six blades 21-26 are provided, one for each opening. Each blade has a length that is slightly shorter than the length of the opening from one side of the grate to the opposite side (with the length of the slots being defined in a direction parallel to the plane of the blade). In addition, the blades are preferably mounted such that they are angularly offset with respect to one another about the axle on which they are supported. Thus each blade is positioned at a slightly different angular orientation about the axle, as shown in FIG. 3. When viewed from a perspective in which the viewer is looking along the line of the axle, each of the blades is positioned such that the axle extends substantially through the center of the blade, with each of the blades being substantially uniformly offset from each adjacent blade. Accordingly, with six blades each blade is angularly offset from the next adjacent blade by an angle of about 30 degrees.

In one example, the axle 28 is formed with a non-circular cross-section, such as a rectangular or oval cross section. Each of the blades 21-26 is formed with a correspondingly shaped bore 29 so that the blade may be carried on the axle, with the axle passing through the bore. As best seen in FIG. 4, the non-circular bore is formed in each of the blades in a sequentially offset angle, thereby allowing each of the separate blades to be angularly offset from an adjacent blade in a sequential fashion. This angular arrangement reduces the number of blades being urged through the grate at any one time, thereby reducing the amount of force required to cause the blades to pass through the grate.

The blades are separated from one another by spacers, for example 61, 62, to ensure even distribution of the blades and to allow for alignment and separation from one another so that the blades will fit smoothly through a respective opening within the grate.

As best seen in FIG. 4, the blades are shaped as an elongated hexagon, having a pair of opposing apexes on opposite sides of the axle. As the axle is offset slightly above the surface of the grate, the shallow angle of the edge of the blade that first passes through the grate allows for a larger area that passes through the grate at substantially the same time, thereby preventing the blade from merely pushing the nut along the surface of the grate instead of forcing the blade through the nut.

The axle is connected to a crank and a handle to allow the axle, and therefore the blades, to be rotated. Preferably the handle is mounted for manual rotation in either direction. In the preferred version, the axle and crank are formed as a single unitary component, with the handle pivotally secured.

In use, nuts are placed in the hopper and the hopper is secured atop the lower container. Rotation of the crank causes the blades to rotate in a first direction corresponding to the direction of rotation of the handle. If the first direction is defined by arrow A in FIG. 4, in which the blades pass through the narrow half of the grate openings as the blades move from the hopper to the container then nuts will be pressed downward by the blades and against the narrow half of the grate (that is, the portion of the grate having narrower openings). Consequently, nuts will tend to fall though the grate only when they are chopped small enough to fit through the narrow openings.

If the crank is rotated in the opposite direction, such that the blades pass from the hopper and through the wider half of the openings and then into the container, nuts will be chopped above the wider openings and then pass through into the container when they are small enough to fit through the wider openings. Thus, by choosing to rotate the crank in either direction the user can selectively chop nuts to either a coarse or fine size.

Once the nuts are chopped and pass through the grate, they can be chopped again if desired to make them finer. Thus, the device can be inverted so that the container becomes the hopper and the hopper becomes the container. This feature is best implemented in a version in which both the container and the hopper are tapered toward the neck to approximate an hourglass shape. Rotation of the crank and the blades causes the nuts to be chopped yet again, making finer pieces of nuts.

In a preferred version, one or both of the hopper and container is transparent and includes volumetric markings 11 to allow the user to see the volume of nuts that have been chopped.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A nut chopper, comprising:
   a main body having a hopper configured to hold a plurality of nuts and a container positioned below the hopper;
   a grate positioned to support the plurality of nuts in the hopper, the grate having a plurality of slots; and
   a plurality of blades carried on an axle and positioned adjacent the grate for rotational movement of the plurality of blades;
   wherein each of the plurality of slots includes a length in a direction parallel to a plane defined by a corresponding one of the plurality of blades, each of the plurality of slots further having a first slot width defined over a first portion of the slot and a second slot width over a second portion of the slot, the first slot width being greater than the second slot width;
   whereby when the axle is rotated the plurality of blades is rotated through the plurality of slots in the grate.

2. The nut chopper of claim 1, further comprising a crank and a handle secured to the axle for enabling manual rotational movement of the axle.

\* \* \* \* \*